United States Patent
Cook et al.

(10) Patent No.: US 8,060,598 B1
(45) Date of Patent: Nov. 15, 2011

(54) COMPUTER NETWORK MULTICASTING TRAFFIC MONITORING AND COMPENSATION

(75) Inventors: Fred S. Cook, Olathe, KS (US); Douglas R. Green, Lenexa, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2874 days.

(21) Appl. No.: 10/186,852

(22) Filed: Jul. 1, 2002

(51) Int. Cl.
*G06F 15/173* (2006.01)
(52) U.S. Cl. .......................... 709/224; 709/223; 709/231
(58) Field of Classification Search .......... 709/223–229, 709/231, 232
See application file for complete search history.

(56) References Cited

U.S. PATENT DOCUMENTS

| | | | | |
|---|---|---|---|---|
| 5,841,970 | A * | 11/1998 | Tabuki | 709/229 |
| 6,018,771 | A | 1/2000 | Hayden | |
| 6,078,590 | A | 6/2000 | Farinacci et al. | |
| 6,173,403 | B1 * | 1/2001 | DeMont | 713/185 |
| 6,173,406 | B1 * | 1/2001 | Wang et al. | 709/223 |
| 6,223,292 | B1 * | 4/2001 | Dean et al. | 713/202 |
| 6,339,791 | B1 * | 1/2002 | Dumortier et al. | 709/238 |
| 6,512,766 | B2 * | 1/2003 | Wilford | 370/389 |
| 6,567,851 | B1 * | 5/2003 | Kobayashi | 709/228 |
| 6,631,420 | B1 * | 10/2003 | Li et al. | 709/242 |
| 6,965,883 | B2 * | 11/2005 | Xu et al. | 705/418 |
| 2003/0172165 | A1 * | 9/2003 | Xu et al. | 709/228 |
| 2003/0212638 | A1 * | 11/2003 | Zhang et al. | 705/50 |

* cited by examiner

*Primary Examiner* — Mohamed Wasel

(57) ABSTRACT

A method is provided for monitoring multicasting traffic in an internetwork between a multicasting source in a first domain and a multicasting destination in a second domain. The multicasting source offers connections to a predetermined multicast stream according to predetermined multicast group information. The multicasting destination sends a join message to a router within the internetwork in order to initiate routing of the predetermined multicast stream to the multicasting destination. A notification of the joining is sent from the router to a ledger application, the notification including identifying information of the multicasting destination and the multicasting source. The multicasting source transmitting datagrams of the predetermined multicast stream to the multicasting destination via the router. The ledger application receives and logs the notification as a transaction event. The transaction events are aggregated in response to the first domain of the multicasting source and in response to the second domain of the multicasting destination, thereby allowing reimbursement of costs between domains for transporting the multicasting traffic.

12 Claims, 4 Drawing Sheets

COMPUTER NETWORK MULTICASTING TRAFFIC MONITORING AND COMPENSATION

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to the multicasting of computer network datagrams to a plurality of recipients, and, more specifically, to monitoring multicast traffic and providing a means for a network domain that performs replication and transport of multicast datagrams to be compensated by the network domain or service that initiates the multicast traffic.

Packets or datagrams transported over a computer network can be sent as unicast, broadcast, or multicast messages. In the IP protocol, multicast messages use reserved IP addresses (Class D) set aside for multicast groups. For example, a source server or host may distribute streaming multimedia (e.g., video and/or audio) or other information as datagrams specifying a particular multicast group number in the destination address. The datagrams propagate via multicast-enabled routers which typically maintain local group databases identifying next-hop routers and/or end user destinations that have requested receiving datagrams from the multicast group. If a router's database identifies more than one destination for a multicast group, the router replicates the datagram and sends it to each destination.

The IP protocol suite includes the Internet Group Management Protocol (IGMP) for managing the interaction between destinations (e.g., end user clients) and multicast-enabled routers. So that multicast traffic does not have to be sent to clients or routers not interested in the particular traffic, multicast group databases maintained in the routers are constantly updated to identify clients or other routers that should receive traffic belonging to specific multicast groups. In most implementations, a client must send a join request to its neighboring router(s) in order to receive multicast group messages. When a client is no longer interested in a multicast stream, it sends a "leave" message to exit the multicast group.

When a router receives a join message for a multicast group that it is not currently receiving, then the router uses a multicast routing protocol such as Protocol-Independent Multicast (PIM) to create the necessary links from a source of the multicast stream to itself. When no longer needed, the router eliminates or prunes multicast distribution links to it that are no longer needed.

For certain kinds of traffic, multicasting can result in significantly more efficient use of overall network resources since multiple copies of the same information packets between any sender/receiver pair are avoided. The greatest savings are realized by the originating server of the multicast content since it does not have to originate separate traffic streams to each destination. Lesser saving are realized by the network backbone and there may be little or no savings in overhead for the destination network (e.g., an Internet service provider (ISP) operating a local area network (LAN) of a destination client).

In the current business model, the backbone provider and the ISP or other destination network have little motivation to provide multicast-enabled networks. The backbone provider receives compensation from the content provider based on the capacity of the purchased access. Since any particular content received as multicast traffic is no different than the same content obtained using unicast transmission (i.e., multicast content is not distinguishable from unicast content from the perspective of the destination client), there is no obvious improvement gained by an ISP's investment in multicast-enabled networks. Thus, an ISP is unlikely to be able to increase prices charged to end users for being multicast-enabled.

The extra costs of terminating multicast streams at the destination end of the network multicasts are borne by entities that derive the least benefit from the reduced network traffic realizable with multicasting. Since the deployment of widespread multicasting requires broad support from backbone providers and destination network providers, the current Internet business model has failed to motivate adoption of multicasting technologies.

SUMMARY OF THE INVENTION

The present invention provides a multicasting system and methods for encouraging widespread support of multicasting within all segments of an internetwork.

In one aspect of the invention, a method is provided for monitoring multicasting traffic in an internetwork between a multicasting source in a first domain and a multicasting destination in a second domain. The multicasting source offers connections to a predetermined multicast stream according to predetermined multicast group information. The multicasting destination sends a join message to a router within the internetwork in order to initiate routing of the predetermined multicast stream to the multicasting destination. A notification of the joining is sent from the router to a ledger application, the notification including identifying information of the multicasting destination and the multicasting source. The multicasting source transmits datagrams of the predetermined multicast stream to the multicasting destination via the router. The ledger application receives and logs the notification as a transaction event. The transaction events are aggregated in response to the first domain of the multicasting source and in response to the second domain of the multicasting destination, thereby allowing reimbursement of costs between domains for transporting the multicasting traffic.

DETAILED DESCRIPTION OF PREFERRED EMBODIMENTS

Figure 1:
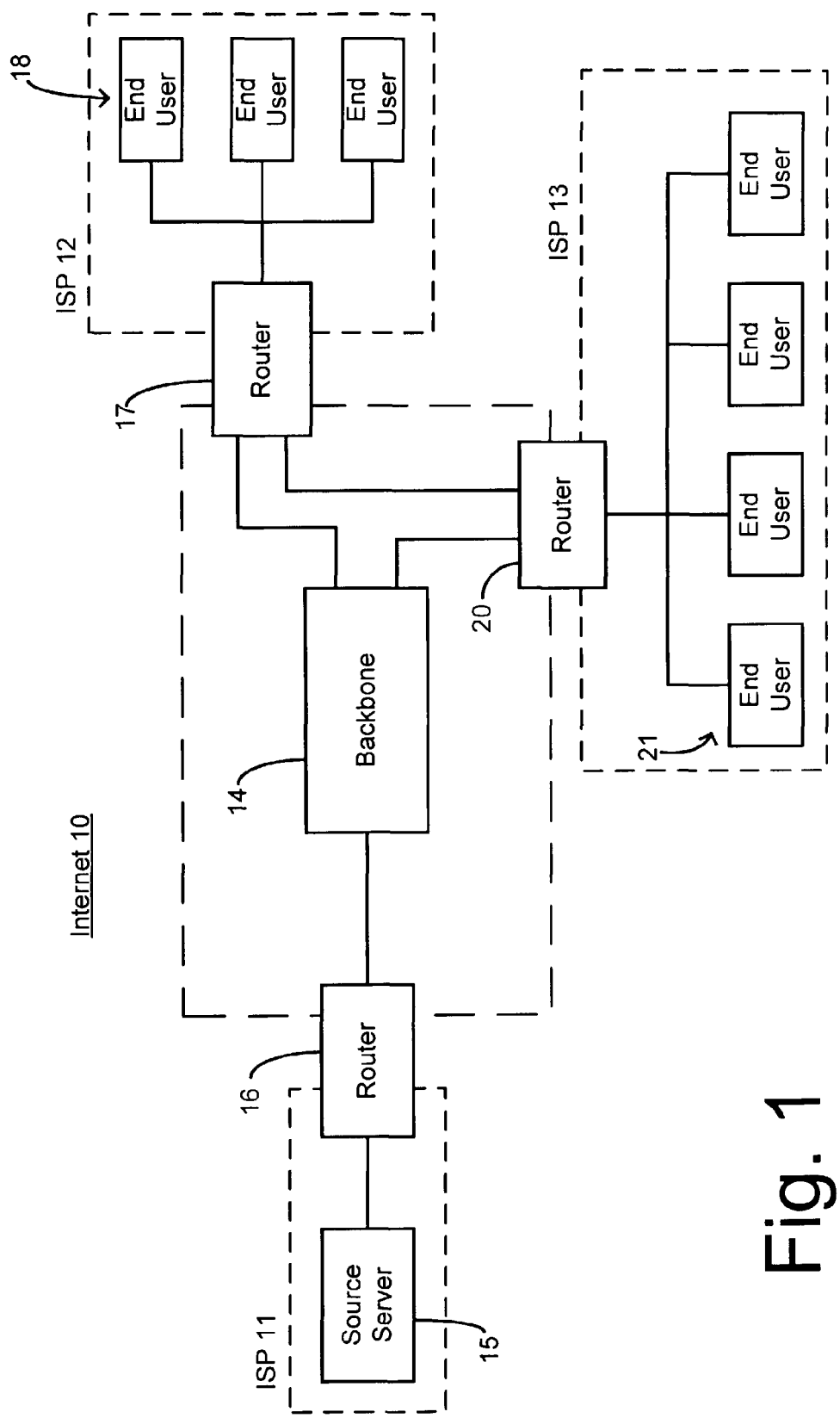
FIG. 1 is a block diagram showing a connection of networks in an internetwork for transporting multicast traffic over a backbone to end users.

Referring to FIG. 1, an internetwork such as the global Internet 10 comprises the interconnection of multiple networks such as Internet Service Provider (ISP) networks 11, 12, and 13, which each may be comprised of a LAN, MAN, RAN, WAN, or other network type. An internetwork backbone 13 provides interconnectivity to carry traffic between remote networks.

With regard to streaming of multicast traffic, a source (i.e., origin) server 15 in ISP 11 transmits multicast datagrams into Internet 10 via a router 16 in ISP 11 which interfaces to backbone 14. ISP 12 has a router 17 interfacing end users 18 to the rest of Internet 10. Likewise, a router 20 in ISP 13 routes traffic between end users 21 and Internet 10. In addition, ISP's may be directly connected separately from the backbone, as shown by the direct connection between routers 17 and 20. End users become a destination client when receiving the streamed multicast traffic from source server 15.

Each respective network may comprise a specific domain within the addressing scheme of the internetwork. As used herein, domain also refers to subdomains within a domain. For example, a particular host identified using a respective subdomain name (e.g., source server 15) is included in the meaning of domain. Thus, the monitoring and accounting of multicasting traffic of the present invention is adaptable to aggregating information for any domain or subdomain level desired.

Various protocols have been defined for establishing multicast traffic distribution, and the present invention is useful no matter what multicast protocols or standards are employed. By way of example, a typical multicasting process requires each end user desiring to receive certain multicast traffic to inform its neighboring router(s) of the multicast group it is interested in (e.g. via a join message). The router checks whether it is currently receiving traffic according to the multicast group number. If not currently receiving it, then further neighboring routers are contacted until a complete path is created back to the multicasting source.

Figure 2:
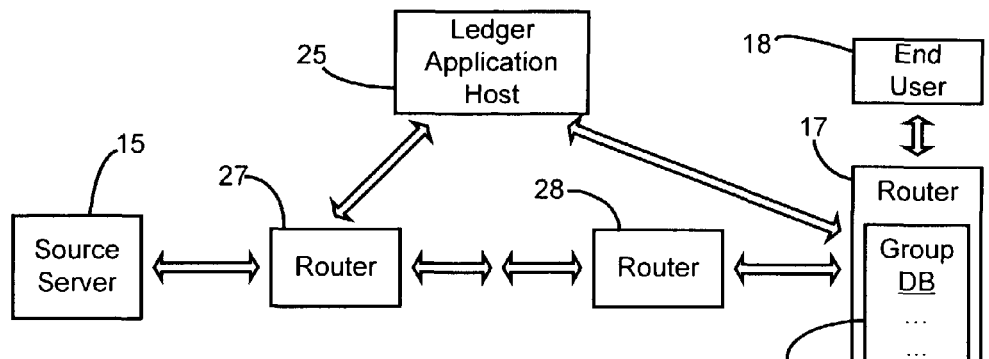
FIG. 2 is a block diagram of communication with a ledger application of the present invention.

FIG. 2 shows a first embodiment of the invention wherein a ledger application runs on a ledger application host 25 for monitoring usage of multicast traffic feeds and for aggregating usage according to domains of multicasting sources and multicasting destinations, thereby providing a mechanism for domains supporting multicast reception by their users to be compensated by the multicasting sources. Host 25 can be located anywhere in Internet 10, but may preferably reside in a computer within the central backbone. Host 25 receives messages itemizing individual multicasting transaction events (e.g., joins and leaves) to be processed by the ledger application.

When end user 18 sends a join message to router 17, the destination IP address of end user 18 is added to a local group database 26 along with the multicast group number. Known protocols may be used (e.g., PIM) to establish a chain of routers for forwarding multicast datagrams of the multicast group from source server 15, through routers 27 and 28, and to router 17. One or more of the multicast-enabled routers (or intermediary devices) are programmed according to the present invention for notifying the ledger application of multicasting activities.

Figure 3:
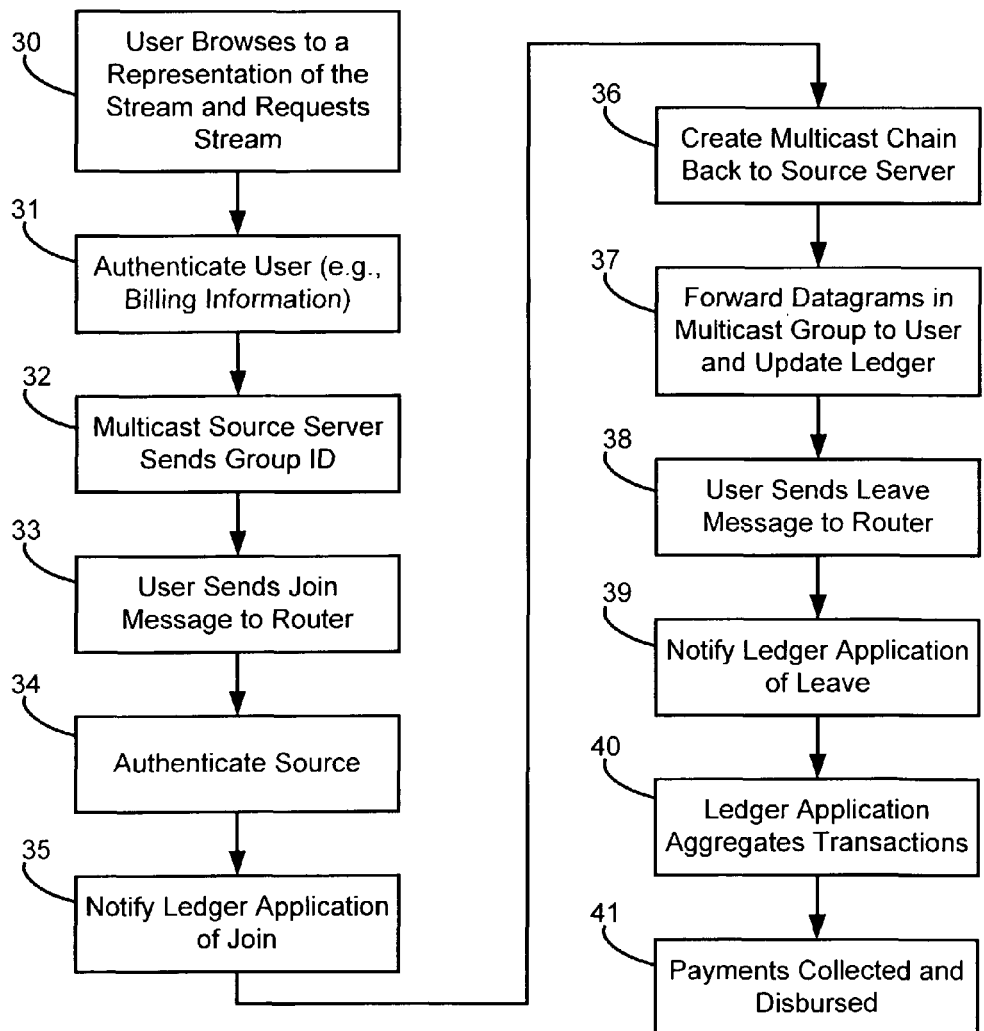
FIG. 3 is a flowchart showing a preferred embodiment of the present invention.

In a preferred embodiment as shown in FIG. 3, a user browses in step 30 (e.g., using a world wide web browser) to a web page representing the multicast source server in order to request reception of a particular stream of multicast traffic (e.g., a video and/or audio stream for display by a multimedia player). The Web page need not be located on the same server as the stream source. Unless the source server does not charge an access fee and gives access to any anonymous requestors, the user may be authenticated in step 31. The user may be required to supply a user ID and password or provide billing information as part of the authentication process. Thus, it is expected that the domain of the source server derives revenue from the transmission of the multicast traffic (e.g., directly from the user or indirectly through advertising).

Once a user is authenticated, the source server sends the multicast group ID of the requested stream to the end user in step 32. This information is sent as a unicast message and provides the information needed by the end user client to construct a join message which it sends to its router in step 33. The source server may also send stream control commands to the streaming source. In connection with digital rights management, a decoding key may also be sent to the end user to be used in decoding a content stream where an encrypted stream is to be sent via multicasting. In step 34, the content source may be authenticated to ensure proper identification of the bill paying entity. In some instances, the content source authentication might not occur until multicast traffic is actually received (thereby identifying the source IP address or domain).

In step 35, a router responds to the joining of the end user (or the end user's domain) by notifying the ledger application of the join. The notification can take place immediately when the join occurs, later after the join is terminated, or later as part of periodic batch updates to the ledger application. It may also be desirable to defer notification until multicast traffic is actually received and forwarded to the end destination.

In step 36, the router servicing the end user (destination client) employs a multicast routing protocol to create a multicast router chain back to the stream from the source server or other closer point receiving the stream (if the router is not already receiving the multicast group on behalf of other destinations). Thereafter, the router receives and forwards multicast datagrams within the multicast group to the requesting destination client in step 37. If desired, the router may update the ledger application with elapsed time status as the destination client continues to participate in the multicast group. The status update should be periodic, based either upon elapsed time interval since the last update or the amount of transported data. Updating for each received packet would result in excessive overhead.

When a user terminates reception of the multicast stream (e.g., by closing their media player or other action to terminate the stream), their client application sends a leave message to the router in step 38. The router notifies the ledger application of the leaving of the particular end user in step 39. In a prior version of a multicasting protocol that did not use "leave" messages, the router periodically polled the users in the local group database to determine if any were still interested in the multicast content. Once any interested destination responded, others would see the first user's response and then would drop their own response in order to reduce network congestion. Thus, the router would not know the identities of all the destinations still interested in the multicast traffic. For the present invention, the destination clients would have to be modified to answer a poll regardless of answers from other clients. Due to the increased network congestion, however, the use of explicit leave messages is preferred.

The ledger application stores and accumulates transaction events over a predetermined period (e.g., a one month billing cycle). Preferably, each transaction event may correspond to an individual multicast session between a user (as identified by a reception domain) and a stream source (as identified by a sending domain, the time, and the group ID). Multiple copies of the ledger application may be deployed, each handling separate regions within the internetwork, for example.

In step 40, the ledger application aggregates its stored transaction events, preferably sorted according to sending domains and reception domains. Using the aggregated events, payments are collected from the sending domains and disbursed to the reception domains and intermediate domains that transported the multicast traffic (e.g., the backbone network) in step 41.

In an alternative embodiment, the present invention can be used within an internal business enterprise for allocating costs between subdivisions of the enterprise. Thus, individual groups or cost centers can be charged back for bandwidth taken up by multicasting traffic within a private network. The ledger application can be located at any convenient location within the private network.

Figure 4:
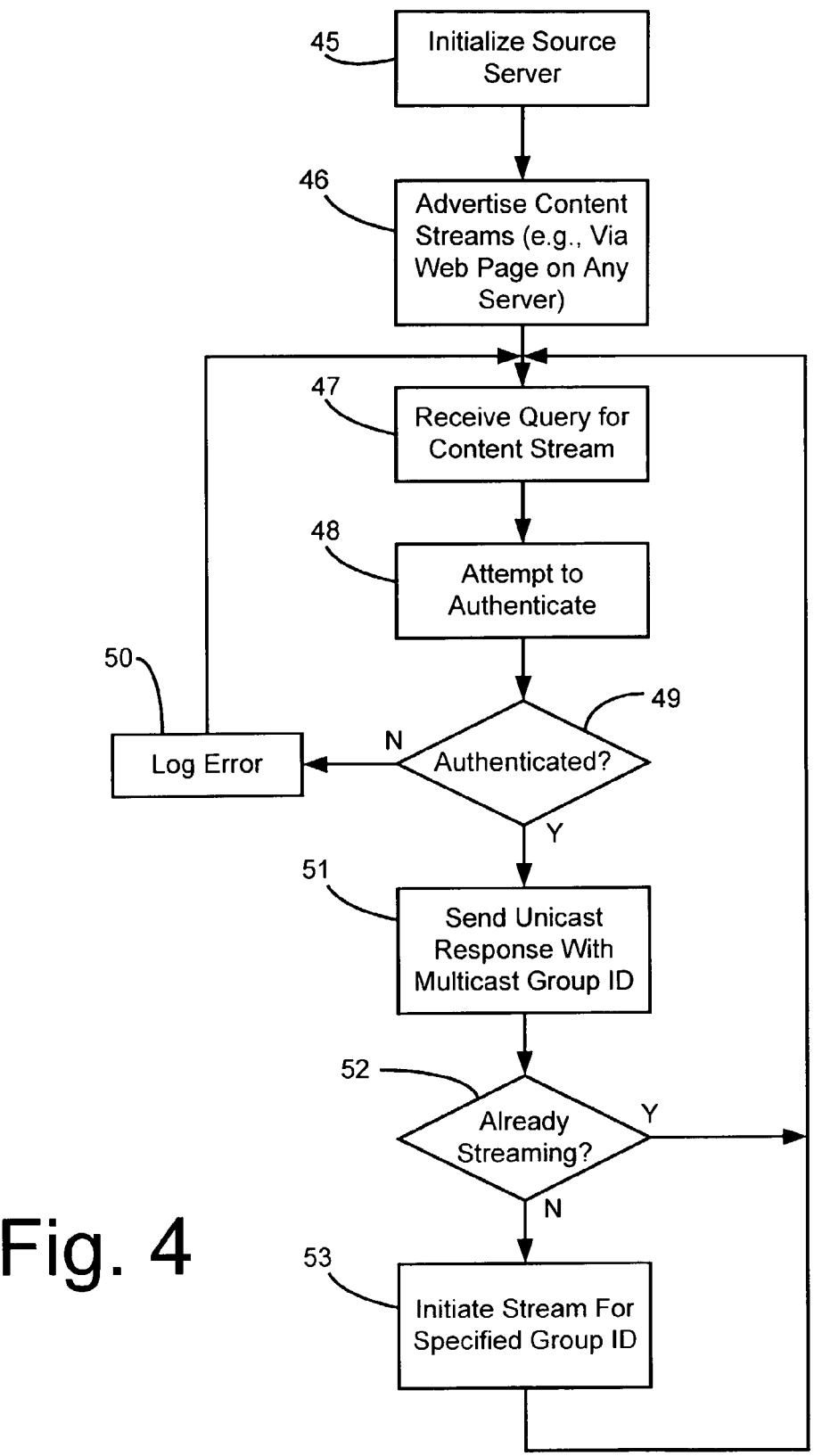
FIG. 4 is a flowchart showing operation of a source server providing multicast streams according to the present invention.

Operation of the source server is shown in greater detail in FIG. 4. The server is initialized in step 45 so that it can advertise its content streams via browsable Web pages in step 46. Eventually, a request for a content stream is received in step 47. The source server attempts to authenticate the requesting user in step 48 (e.g., determining requestor ID and a billing account ID). A check is made in step 49 to determine whether the user has been authenticated. If not, then an error may be logged in step 50 and a return is made to step 47 for handling further requests.

If the user is properly authenticated and their request is valid, then a unicast message is sent from the source server to the end user destination client in step 51 informing it of the multicast group ID being used for the requested stream. A check is made in step 52 to determine whether the requested stream is already being transmitted. If it is, then a return is made to step 47. If not already streaming that multicast group then the stream is initiated in step 53.

Figure 5:
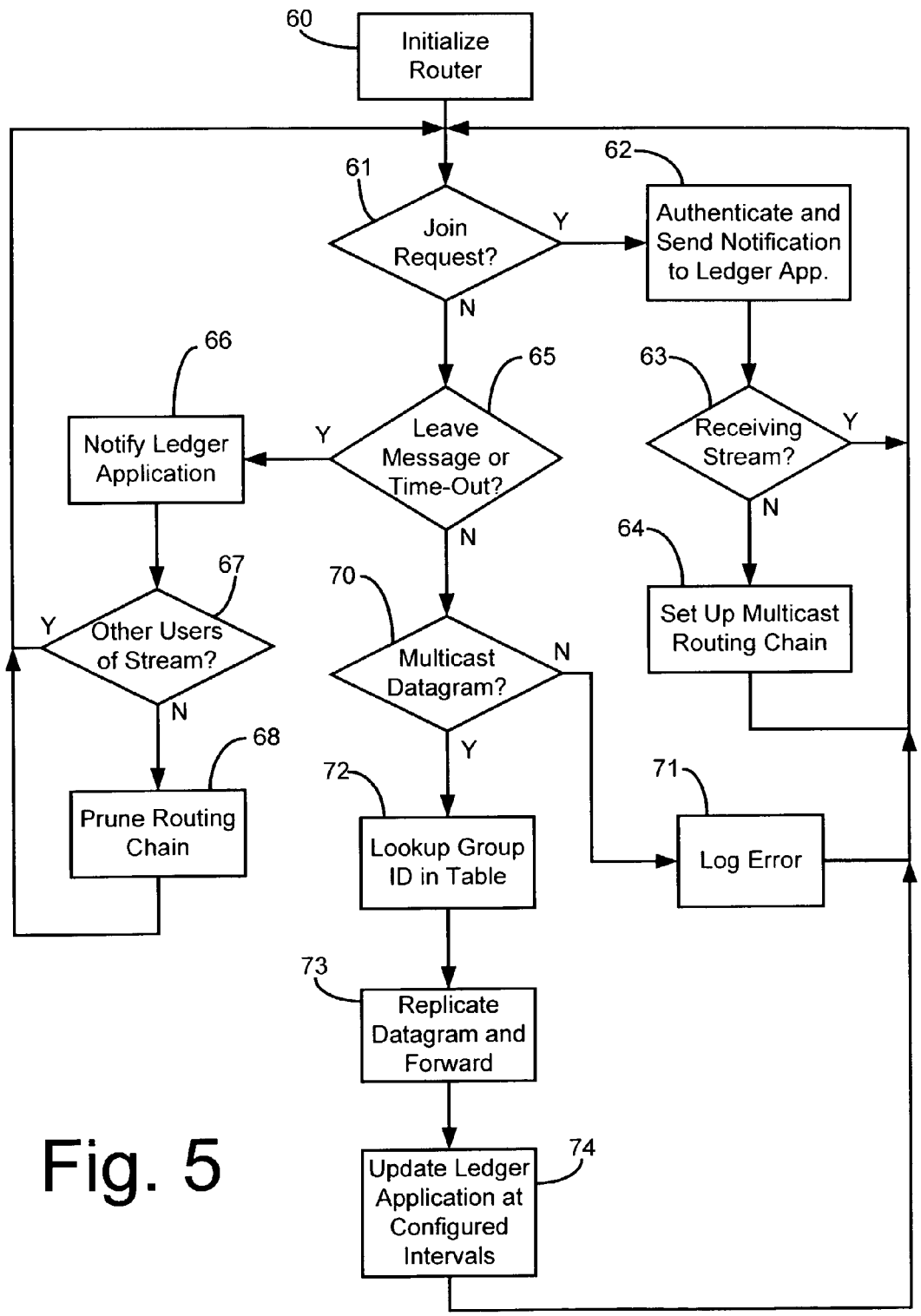
FIG. 5 is a flowchart showing operation of a network router according to the present invention.

Router operation is shown in greater detail in FIG. 5. Although the operation is shown primarily in the context of a neighboring router directly servicing a destination network, some or all of the same functions may be performed in routers or other devices at other locations in the multicast distribution chain.

After initialization in step 60, the router receives multicast-related packets. In step 61 a check is made to determine whether a join message is being received. If so, then any necessary authentication is performed and the ledger application is notified of the join in step 62. The notification includes identifying information of the multicasting destination (e.g., the domain where the end user resides) and an identification of the multicasting source (e.g., the domain where the source server resides or the multicast group number and timestamp which may be subsequently correlated with the correct domain by the ledger application). In step 63, the router checks to determine whether the multicast stream identified by the multicast group ID is already available to the router. If so, then a return is made to step 61; otherwise the router sets up a multicast routing chain of the multicast group ID in step 64 before returning to step 61.

If a join message is not detected in step 61 then a check is made in step 65 to determine whether a leave message is being received (or if periodic polling of destinations is being used then whether a time-out has occurred after polling a user identified in the group database). If yes, then the router notifies the ledger application of the leave in step 66. The notification of the leave message may include a duration of time between a join message and a corresponding leave message and a transmission count or error count, for example. A check for other users of the stream is made in step 67. If other users exist in the group database for the particular multicast group ID then a return is made to step 61; otherwise the multicast routing chain is pruned in step 68 prior to returning to step 61.

If a leave message is not detected in step 65, then a check is made in step 70 for a multicast datagram being transmitted in the stream. If the packet is not a datagram, then an error may be logged in step 71 before returning to step 61. If a datagram is present, then the router looks up the multicast group ID in step 72. If database entries are found, then the datagram is replicated and sent to each interested destination (e.g., end users or further routers in a chain) in step 73. If desired, the ledger application can be updated of the ongoing usage of the multicast traffic by the identified users (i.e., domains) in step 74, and a return is made to step 61. Preferably, any updates occur at predetermined intervals of time or predetermined amounts of data transported.

In an alternative embodiment of the present invention, network protocols other than the multicast protocols themselves can be used to identify the reception of multicast traffic. For example, protocols for monitoring use of copyrighted content can be employed since such content is frequently distributed in multicast streams. Thus, a user may enroll to receive a copyright restricted feed (by generating a license acknowledgement message or payment authorization, for example), and the ledger application is notified of the enrollment (together with the source and destination domains, the duration of the transmission, and an action identifier, for example).

What is claimed is:

1. A method of monitoring multicasting traffic in a network between a multicasting source in a first domain and a multicasting destination in a second domain, wherein said multicasting source offers connections to a predetermined multicast stream according to predetermined multicast group information, said method comprising the steps of:

said multicasting destination sending a join message to a router within said network in order to initiate routing of said predetermined multicast stream to said multicasting destination;

sending a notification of said joining from said router to a ledger application, said notification including identifying information of said multicasting destination and said multicasting source;

said multicasting source transmitting datagrams of said predetermined multicast stream to said multicasting destination via said router;

said ledger application receiving and logging said notification as a transaction event; and sorting transaction events according to said first domain of said multicasting source and according to said second domain of said multicasting destination, wherein said sorted transaction events identify a reimbursement of costs between domains for transporting said multicasting traffic.

2. The method of claim 1 further comprising the steps of:
said multicasting destination sending a leave message;
said router terminating forwarding of said datagrams to said multicasting destination;
said router sending a leave notification to said ledger application; and
said ledger application receiving and logging said leave notification;
wherein said transaction event is updated in response to a duration of time between said join message and said leave message.

3. The method of claim 1 further comprising the steps of:
said router detecting a termination of interest in said predetermined multicast stream by said multicasting destination;
said router terminating forwarding of said datagrams to said multicasting destination;

said router sending a termination notification to said ledger application; and said ledger application receiving and logging said termination notification;

wherein said transaction event is updated in response to a duration of time between said join message and said termination notification.

4. The method of claim 1 further comprising the step of:

authenticating said multicasting source in response to said join message, wherein said notification of said joining and said transmission of datagrams to said multicasting destination occur only after successful authentication.

5. The method of claim 1 wherein said network is a private network for a business enterprise having a plurality of subdivisions, said method further comprising the step of:

charging said aggregated transaction events against respective ones of said subdivisions.

6. The method of claim 1 further comprising the steps of:

collecting payment from said first domain according to said aggregated transaction events; and disbursing payment to said second domain according to said aggregated transaction events.

7. The method of claim 6 wherein said transmission of datagrams includes transport over a backbone network operated by a backbone provider, wherein said ledger application runs in said backbone network, and wherein said collecting and disbursement steps are performed by said backbone provider.

8. A ledger application for executing on a host within a computer network to monitor multicasting traffic in an internetwork between a multicasting source in a first domain and a multicasting destination in a second domain, wherein said multicasting source offers connections to a predetermined multicast stream according to predetermined multicast group information, said ledger application comprising:

means for receiving a notification from a router of a joining of a multicasting destination with said predetermined multicast stream, said notification including identifying information of said multicasting destination and said multicasting source;

means for logging said notification as a transaction event; and means for sorting transaction events according to said first domain of said multicasting source and according to said second domain of said multicasting destination, wherein the sorted transaction events identify a reimbursement of costs between domains for transporting said multicasting traffic.

9. The ledger application of claim 8 further comprising:

means for receiving a leave notification from said router when said multicasting destination terminates reception of said predetermined multicast stream;

means for logging said leave notification; and means for updating said transaction event in response to a duration of time between said join notification and said leave notification.

10. A method of operating a multicast-enabled router in an internetwork, said method comprising the steps of:

receiving an enroll message from a destination client requesting receipt of a predetermined multicast content stream from a source server connected to the internetwork;

determining a user identification corresponding to said destination client;

determining a source identification corresponding to said source server;

creating at least a portion of a multicast stream path between said source server and said destination client to include the multicast-enabled router;

sending notification to a ledger application of a transaction event defined by said enroll message, said user identification, and said source identification;

receiving a leave message from the destination client when the predetermined multicast content stream is no longer desired by the destination client; and sending notification to said ledger application to update said transaction event according to said leave message, whereby a duration between notification of the enroll message and notification of said leave message identifies a cost reimbursement for transporting said multicasting content stream.

11. The method of claim 10 wherein said predetermined content stream is sent as multicast datagrams from said source server and wherein said enroll message is comprised of a join message sent from said destination client to said multicast-enabled router in a multicast group management protocol.

12. The method of claim 10 wherein said predetermined content stream is comprised of licensed content and wherein said enroll message is comprised of a license acknowledgement message sent from said destination client to said source server.

* * * * *